US012609006B1

(12) United States Patent
Johnston

(10) Patent No.: US 12,609,006 B1
(45) Date of Patent: Apr. 21, 2026

(54) SELF-SERVICE TERMINAL WITH CASH TRAP DEVICE PREVENTION

(71) Applicant: Cardtronics USA, Inc., Atlanta, GA (US)

(72) Inventor: Kevan Douglas Johnston, Scotland (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/208,754

(22) Filed: May 15, 2025

(51) Int. Cl.
*G07F 19/00* (2006.01)

(52) U.S. Cl.
CPC .......... *G07F 19/207* (2013.01); *G07F 19/205* (2013.01)

(58) Field of Classification Search
CPC ....... G07D 11/00; G07F 19/20; G07F 19/203; G07F 19/205; G07F 19/207
See application file for complete search history.

(56) References Cited

U.S. PATENT DOCUMENTS

2018/0247286 A1* 8/2018 Denny ................ G07F 19/2055
2021/0312768 A1* 10/2021 Newman ............... G06F 3/0445
2023/0252864 A1 8/2023 Costello et al.
2025/0104501 A1 3/2025 MacInnes et al.
2025/0104537 A1 3/2025 McGrath et al.

* cited by examiner

*Primary Examiner* — Laura A Gudorf
(74) *Attorney, Agent, or Firm* — Notaro, Michalos & Zaccaria P.C.; John S. Economou

(57) ABSTRACT

A terminal includes a shutter that is configured to cover a media dispenser slot in a closed position and to provide access to the media dispenser slot in an open position. The shutter may have at least a part thereof that is transparent with a display mounted between the shutter and the media dispenser slot that is viewable through the transparent part. The shutter may have a touch sensor mounted on an outer surface thereof. The terminal is configured to open the shutter and dispense media only after the user enters the code displayed on the display on a keypad and/or touches the touch sensor. Furthermore, the terminal may include a distance sensor used to detect the presence of a cash trap device based on a threshold that is dynamically changed when the shutter remains open for periods of time longer than a predetermined range.

16 Claims, 6 Drawing Sheets

SELF-SERVICE TERMINAL WITH CASH TRAP DEVICE PREVENTION

FIELD

The present disclosure relates to a self-service terminal having cash trap prevention.

BACKGROUND

Cash trapping is when a thief places a fraudulent device over a cash shutter that covers the cash dispenser slot of a self-service terminal (SST), such as an automated teller machine (ATM), and leaves with the fraudulent device inserted into the ATM. To a user, the fraudulent device appears to be a closed shutter on the cash dispense module and is very difficult to detect. The fraudulent device typically is designed to cover the cash dispense module and appear to look like a natural part of the ATM.

In some cases, the fraudulent device may simply cover the cash shutter so that, when the ATM attempts to dispense cash during a customer transaction, the customer will not be able to see the shutter open and will not be able to access the dispensed cash. This type of fraudulent device is typically used in jurisdictions which do not allow cash retraction when not taken by the customer (due to partial withdrawal fraud issues). Once the customer leaves the ATM without the dispensed cash, the thief removes the fraudulent device and takes the dispensed cash.

In other cases, the fraudulent device may also include an internal mechanism which grips dispensed cash so the cash cannot be retracted if not taken by the customer. Here, even if the ATM attempts to retract the dispensed cash when not taken by the customer, some or all of the dispensed cash may be held by the internal mechanism so that the thief can, once the customer leaves the ATM, remove the fraudulent device and take the dispensed cash held by the internal mechanism.

This type of fraud at SSTS/ATMs is challenging to prevent, detect, and address for banks and their customers. Thus, there is thus a need for an improved SST/ATM which prevents cash trapping fraud.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure. The present disclosure describes cash trap prevention solutions in terms of an automated teller machine, but such solutions are applicable to any type of self-service terminal that dispenses cash and has a cash dispense slot covered by a movable shutter. Each embodiment of an automated teller machine is shown in simplified form with only those elements necessary for comprehending the teachings presented. Notably, more, or less components can exist without departing from the teachings herein. Although, the present disclosure describes an automated teller machine that dispenses cash money, the teachings herein apply to any terminal that dispenses media.

Figure 1:
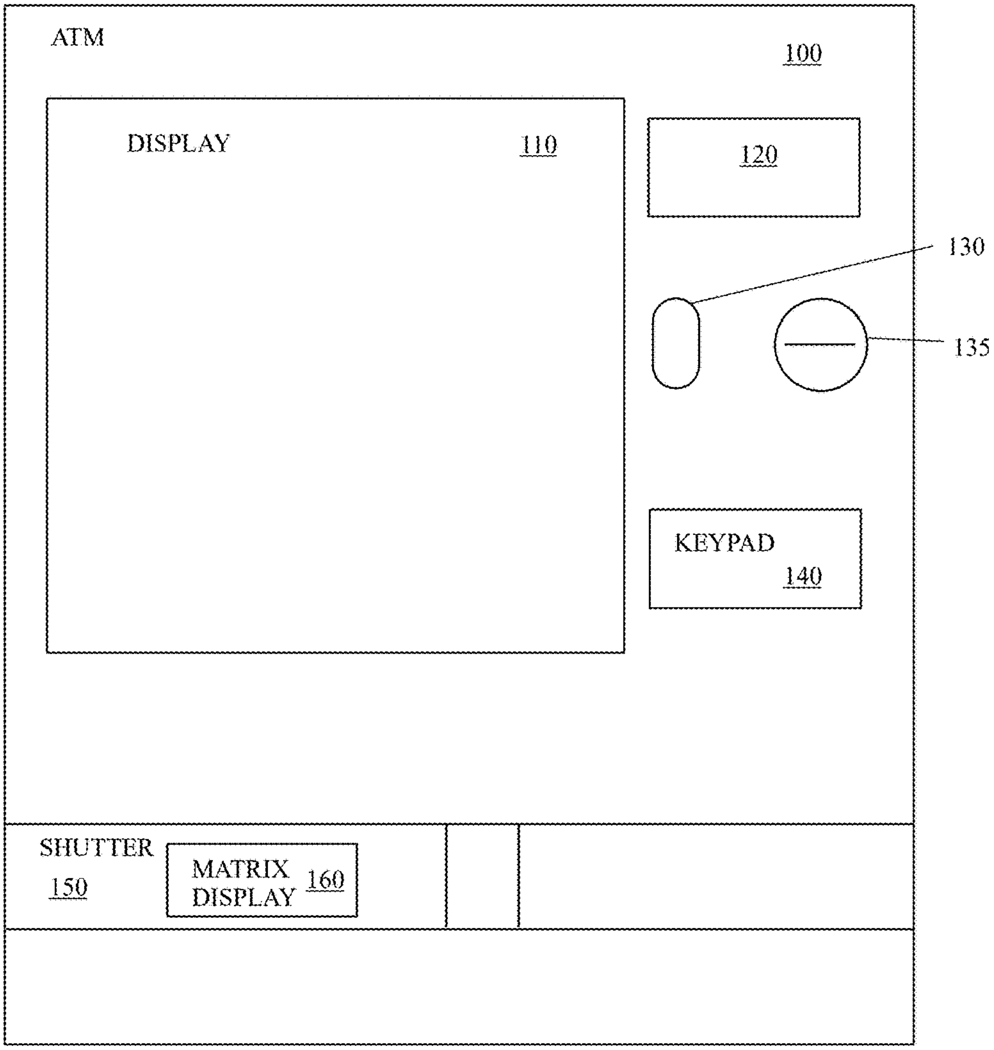
FIG. 1 is a diagram of an automated teller machine incorporating a first embodiment of a fraud prevention system according to the present disclosure.

Referring now to FIG. 1, a diagram of a first embodiment of an automated teller machine (ATM) 100 is shown that incorporates hardware and software that prevents cash trapping. ATM 100 may include a display screen 110, a receipt printer 120, a contactless card reader 130, a card reader slot 135 for a direct card reader, a keypad 140, and a shutter 150. The display screen 110 displays instructions, options, and transaction details to a customer. The receipt printer 120 provides a printed receipt to the customer that shows details of a completed transaction. The contactless card reader 130 has a dedicated area on the front of the ATM 100 where the customer can touch a contactless-enabled bank card to for a transaction without inserting the bank card into the card reader slot 135. The information on the contactless-enabled bank card may be read using Near Field Communication technology. In the alternative, the customer may instead insert their bank card into the card reader slot 135 so that the card reader can read the information stored on the magnetic strip or chip of the bank card. The keypad 140 is where the customer enters their Personal Identification Number (PIN) for authentication. The shutter 150 is a mechanism that opens and closes to give a customer access to a cash dispenser slot only when open during a withdrawal. The shutter 150 typically includes a door or flap that is motor driven and stays open only for a short period of time.

In the embodiment of FIG. 1, the shutter 150 is formed from a transparent material or has a transparent window therein. The transparent material or transparent window may be formed from a chemically strengthened glass for protection. A matrix display 160 is provided on an internal surface of the shutter 150, visible through the transparent material or transparent window of the shutter 150. Alternatively, the matrix display 160 may be fixedly mounted behind the shutter 150 so that it can be viewed through the transparent material or transparent window of the shutter 150. Preferably, when the shutter 150 includes a transparent window, the transparent window is aligned with the cash dispenser slot so that a customer can see whether or not cash has been dispensed. This further aids detection of fraudulent devices.

Figure 2:
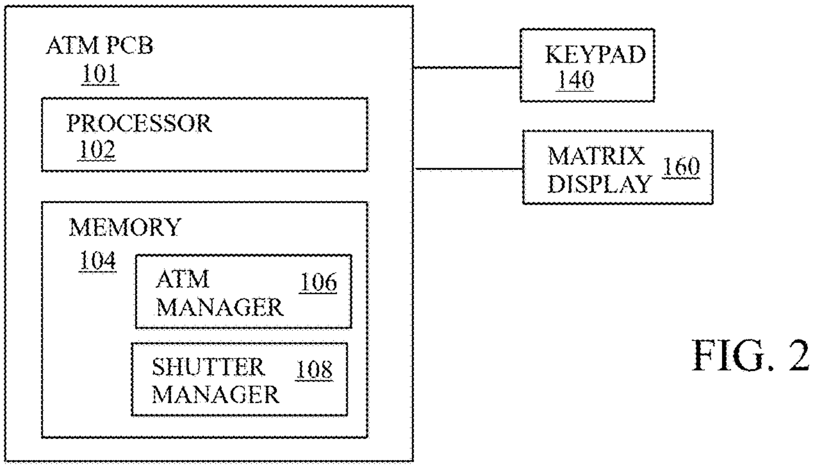
FIG. 2 is a block circuit diagram for the automated teller machine of FIG. 1.

The operations of the ATM 100 are controlled by a processor operating according to stored software, as shown in simplified block circuit diagram of FIG. 2. This block circuit diagram shows only the elements related to the operation of the shutter 150 according to this embodiment. A processor 102 and a memory 104 are shown mounted on a printed circuit board 101. The memory 104 is a non-transitory computer-readable storage media and includes an ATM manager module 106 that controls the normal operation of the ATM and a shutter manager module 108 that controls the operation of shutter 150 according to flowchart 200 shown in FIG. 3.

Figure 3:
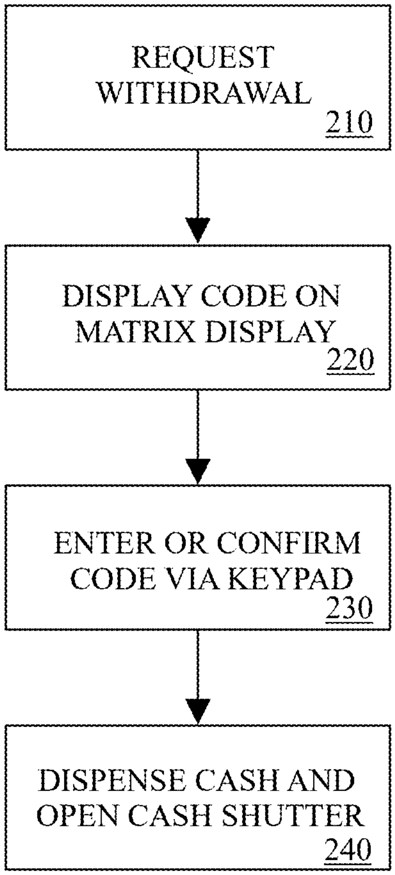
FIG. 3 is a flow chart of a method of use of the automated teller machine of FIG. 1 according to the present disclosure.

Referring now to FIG. 3, a flowchart 200 is shown describing the cash withdrawal process using the ATM 100 of FIG. 1. In a first step 210, a customer requests a cash withdrawal. In response, at step 220, the ATM 100, via shutter manager module 108, causes a code to be displayed on the matrix display 160. The code may be a random number or may be related to customer information, e.g., initials of the customer or a portion of the customer's account number. If the code is a random number, the ATM 100, via shutter manager module 108, instructs the customer to enter the displayed code on the keypad 140. If the code is related to customer information, the ATM 100, via shutter manager module 108, instructs the customer to confirm that the information is visible via the keypad 140. At step 230, the customer either enters the displayed code or confirms that the information is visible, via the keypad 140. Finally, at step 240, the ATM 100 dispenses the requested cash and, via shutter manager module 108, opens the shutter 150 to allow the customer to take the dispensed cash. ATM 100 prevents cash trapping fraud, which relies on completely covering the shutter 150, because the customer must be able to see the matrix display 160 through the transparent shutter 150 or through a window in shutter 150 (and provide confirmation thereof) before any cash is dispensed and the cash shutter is opened. If a cash trap device had been installed, the customer would not be able to see matrix display 160 at all.

Figure 4:
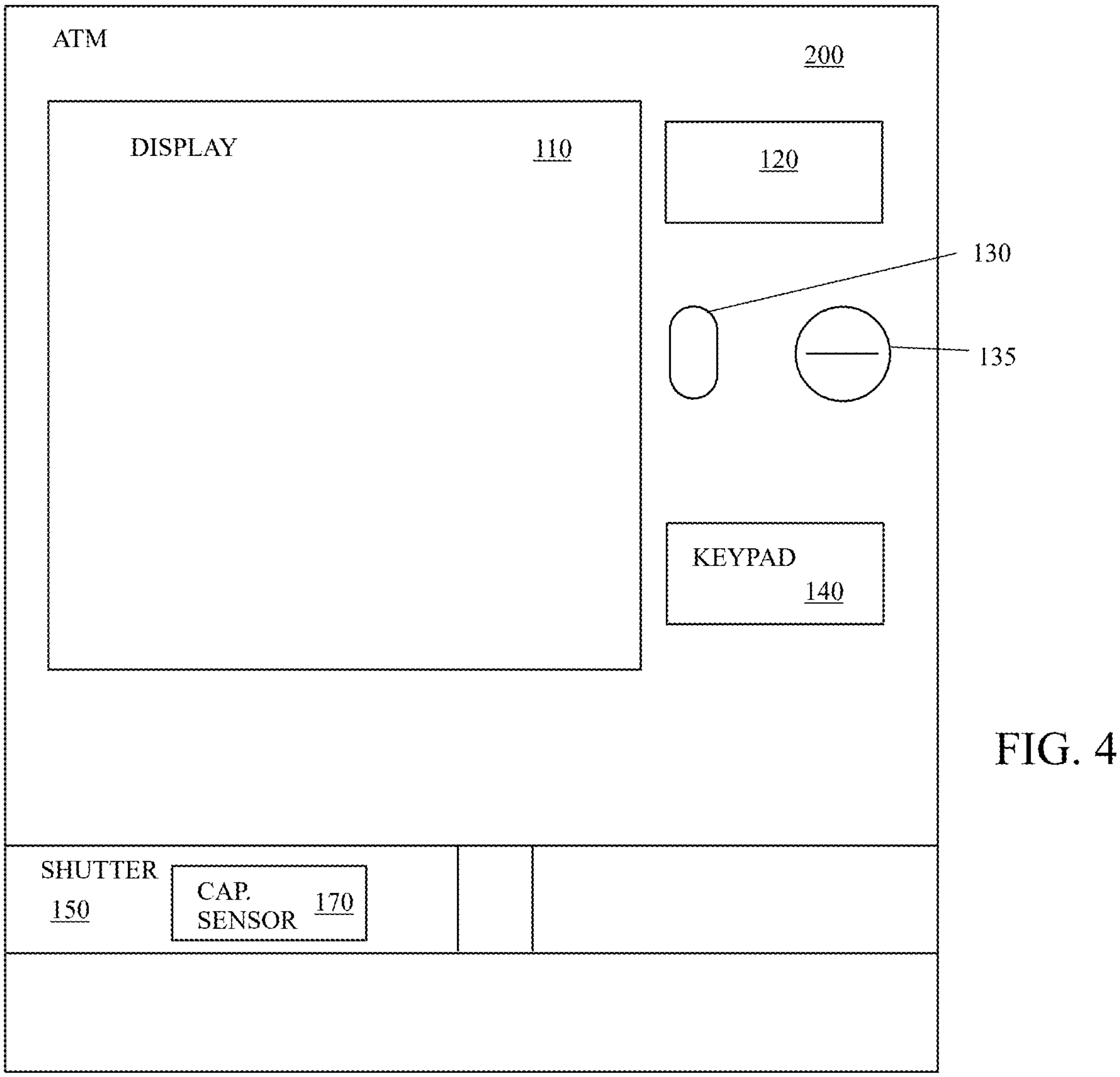
FIG. 4 is a block diagram of an automated teller machine incorporating a second embodiment of a fraud prevention system according to the present disclosure.

Referring now to FIG. 4, a diagram of a second embodiment of an ATM 200 is shown that incorporates hardware and software that prevents cash trapping. In this embodiment, a sensor 170 is added to the front of the shutter 150. The sensor 170 acts as a touch pad and responds when a user touches the sensor. Preferably, the sensor 170 is a capacitive sensor and the capacitance of the capacitive sensor 170 changes when a customer's finger (which conducts electricity) touches the surface thereof, thereby providing a signal to the ATM 200 indicating that the customer has touched the capacitive sensor 170. Other sensors which provide a signal when touched may be used as well, including a resistive touch sensor, a piezoelectric sensor, an optical touch sensor, an inductive touch sensor, a force-sensitive resistor, a hall effect sensor, a touch-activated membrane switch, a surface acoustic wave (saw) sensor, or a triboelectric sensor.

Figure 5:
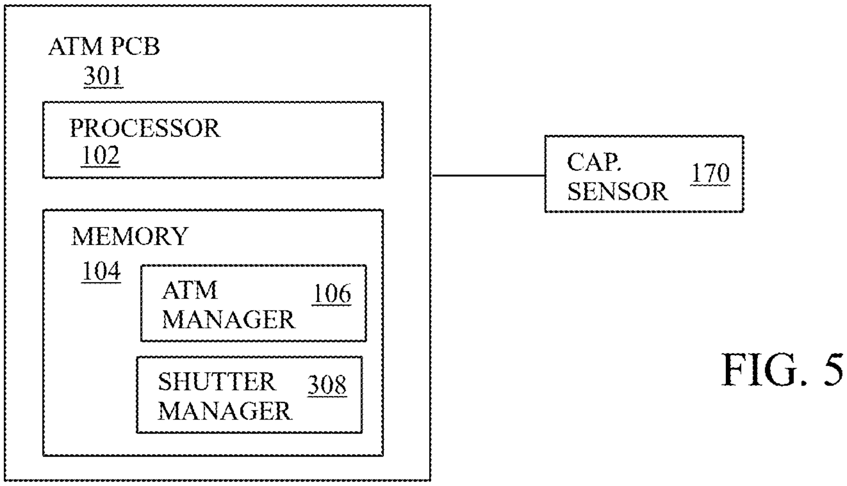
FIG. 5 is a block circuit diagram for the automated teller machine of FIG. 5.

The operations of the ATM 200 are controlled by a processor operating according to stored software, as shown in simplified block circuit diagram of FIG. 5. This block circuit diagram shows only the elements related to the operation of the shutter 150 according to this embodiment. A processor 102 and a memory 104 are shown mounted on a printed circuit board 201. The memory 104 is a non-transitory computer-readable storage media and includes an ATM manager module 106 that controls the normal operation of the ATM and a shutter manager module 308 that controls the operation of shutter 150 according to flowchart 300 shown in FIG. 6.

Figure 6:
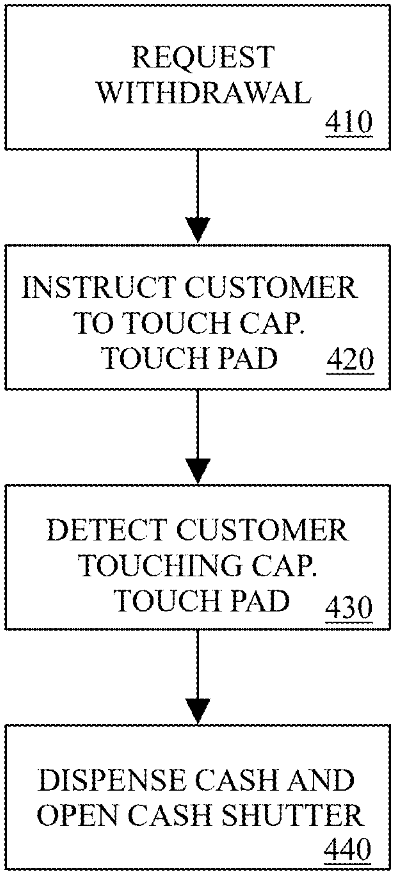
FIG. 6 is a flow chart of a method of use of the automated teller machine of FIG. 4 according to the present disclosure.

Referring now to FIG. 6, a flowchart 400 is shown describing the cash withdrawal process using the ATM 200 of FIG. 3. In a first step 410, a customer requests a cash withdrawal. In response, at step 420, the ATM 200, via shutter manager module 108, instructs the customer to touch the capacitive sensor 170 on the front of the shutter 150. At step 430, the ATM 200, via shutter manager module 108, detects that the customer has touched the capacitive sensor 170. Finally, at step 440, the ATM 200 dispenses the requested cash and, via shutter manager module 108, opens the shutter 150 to allow the customer to take the dispensed cash. ATM 200 prevents cash trapping fraud, which relies on completely covering the shutter 150, because the customer must be able to touch the capacitive sensor 170 on the outer part of the shutter 150 before any cash is dispensed and the cash shutter is opened. If a cash trap device had been installed, the customer would not be able to touch the capacitive sensor 170 at all.

Figure 7:
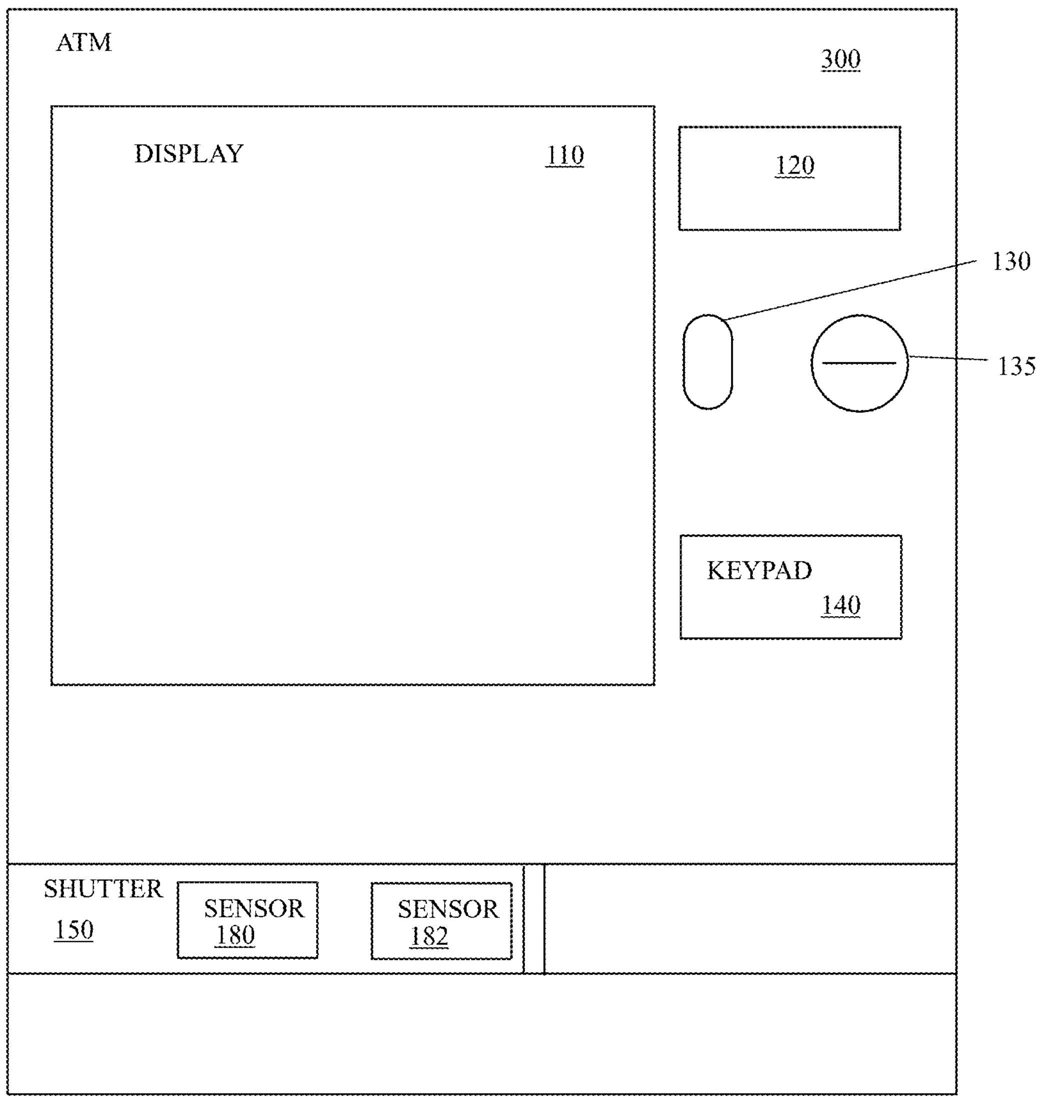
FIG. 7 is a block diagram of an automated teller machine incorporating a third embodiment of a fraud prevention system according to the present disclosure.

Referring now to FIG. 7, a diagram of a third embodiment of an ATM 300 is shown that incorporates hardware and software that prevents cash trapping. In this embodiment, the ATM 300 includes one or more sensors 180 mounted inside the shutter 150, each adjacent to the cash exit slot, to determine if a shutter overlay has been fitted over the shutter 150. The ATM 300 also may include one or more optical sensors 182 mounted inside the shutter 150 used to detect when the shutter 150 is open or closed. Each sensor 180 may be an Infrared Time of Flight sensor or an ultrasonic sensor that provides a measurement of a distance from the sensor itself to an object (here the object is the inner surface of door or flap of the shutter 150).

Figure 8:
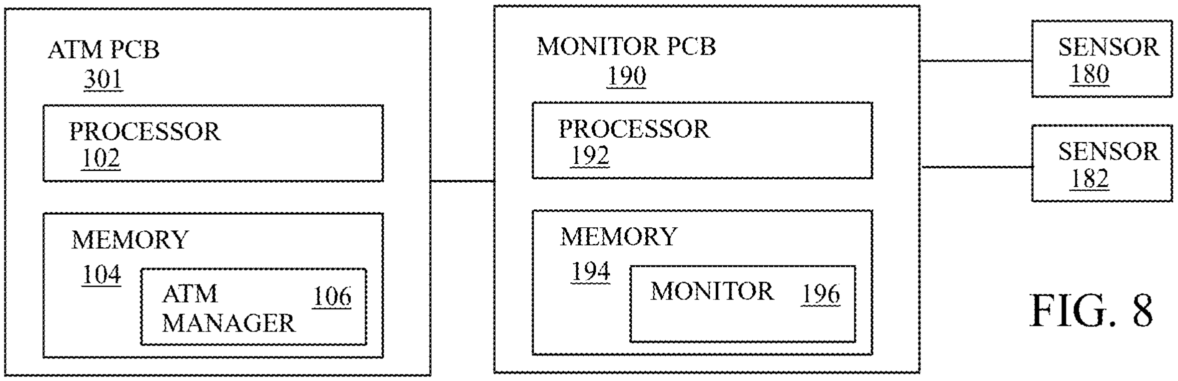
FIG. 8 is a block circuit diagram for the automated teller machine of FIG. 7.

The operations of the ATM 300 are controlled by a processor operating according to stored software, as shown in simplified block circuit diagram of FIG. 8. This block circuit diagram shows only the elements related to the operation and control of the shutter 150 according to this embodiment. A processor 102 and a memory 104 are shown mounted on a printed circuit board 301. The memory 104 is a non-transitory computer-readable storage media and includes an ATM manager module 106 that controls the normal operation of the ATM. A separate monitor printed circuit board 190 may be coupled to the printed circuit board 301. The monitor printed circuit board 190 includes a processor 192 and a memory 194. The memory 194 is a non-transitory computer-readable storage media and includes a monitor module 196 that controls the operation of shutter 150 according to flowchart 300 shown in FIG. 9. The monitor module 196 also receives signals from sensors 180 and is configured to compare the signals to predetermined known expected distance measurements (the predetermined distance threshold) between the sensors 180 and the inside surface of the shutter 150 when the shutter 150 is in a closed state (or should be in a closed state). When the results of such comparison show an object further away from the sensors 180 than expected (meaning that the shutter 150 has been forced open), this indicates that a cash trap device has been fitted. The monitor module 196 also receives signals from sensors 182 indicating that the shutter 150 is either open or closed and is also configured to calculate how long the shutter 150 remains open for each transaction, i.e., to measure the actual shutter open time.

When the predetermined distance threshold is fixed, a thief might be able to design a fraudulent overlay device that is positioned within the predetermined distance threshold, meaning that the monitor module 196 will not detect the device. One way to determine whether fraudulent overlay devices have been used is to examine shutter open times. The monitor module 196 is preconfigured with range information for expected shutter open times. When the monitor module 196 detects that a statistically significant number of actual shutter open times fall outside of the preconfigured range, the monitor module 196 is configured to dynamically adjust the predetermined distance threshold to make it more difficult to fix a fraudulent overlay device. Furthermore, when the monitor module 196 detects that an extended number of the statistically significant actual shutter open times fall outside of the preconfigured range, the monitor module 196 may signal the ATM manager module 106 to disable cash dispensing.

Figure 9:
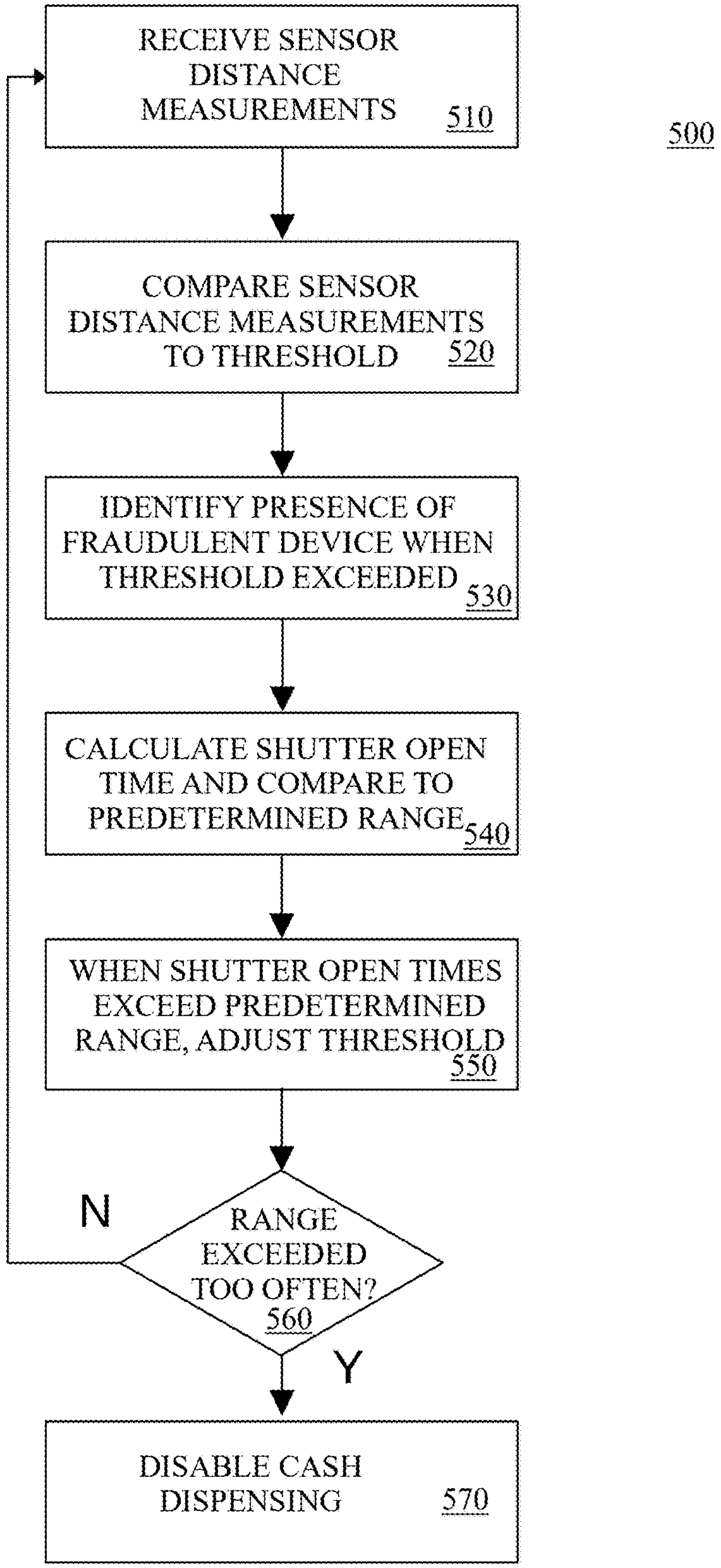
FIG. 9 is a flow chart of a method of use of the automated teller machine of FIG. 7 according to the present disclosure.

Referring now to FIG. 9, a flowchart 500 is shown describing the process of dynamically adjusting thresholds in order to prevent fraudulent overlay device from being fitted to the ATM. In a first step 510, the monitor module 196 receives distance measurements from the sensors 180 during time periods when the shutter 150 is closed and then, at step 50, compares the received sensor measurements to predetermined thresholds for each of the sensors 180. The monitor module 196 identifies the presence of a fraudulent overlay device when a statistically significant number of received distance measurements for one or more of the sensors 180 exceed the predetermined threshold for the associated one of the sensors 180. Monitor module 196, at step 540, continuously calculates the shutter open time for each transaction at the ATM (e.g., via signals from sensors 182) and compares such calculated time with a predetermined range of expected shutter open times. At step 550, when the monitor module 196 determines that the calculated shutter open times exceed the predetermined range of expected shutter open times, monitor module 196 adjusts the predetermined thresholds for each of the sensors 180 downward to make it more difficult to fit a fraudulent overlay device. In some cases, when the monitor module 196 determines that the calculated shutter open times have not exceeded the predetermined range of expected shutter open times for a predetermined period, monitor module 196 may adjust the predetermined thresholds for each of the sensors 180 upward to make it more difficult for a thief to identify the actual predetermined threshold. If the monitor module 196 determines that the calculated shutter open times have exceeded the predetermined range of expected shutter open times too often (step 560), monitor module 196 signals the ATM manager to disable cash dispensing at step 570. Otherwise, normal operation resumes at step 510.

By dynamically adjusting the threshold levels in this manner, it becomes more difficult for a thief to design a fraudulent overlay device that will not be detected using the measurements provided by sensors 180 and will allow the ATM to continue to operate and dispense cash without being disabled.

As evident from the foregoing, the teachings of the three disclosed embodiments can be combined together provide redundant mechanisms to prevent and detect the presence of a fraudulent device used for cash trapping.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A terminal, comprising:

a main display;

a keypad;

a media dispenser slot;

a shutter mechanism having a door or flap portion that is configured to cover the media dispenser slot in a closed position and to provide access to the media dispenser slot in an open position, the door or flap portion having at least a part thereof that is transparent;

a second display mounted between the door or flap portion of the shutter mechanism and the media dispenser slot, wherein the second display is viewable through the transparent part of the door or flap portion of the shutter mechanism;

a processor; and a non-transitory computer readable storage medium comprising executable instructions that cause the processor to perform operations comprising:

causing a code to be displayed on the second display when a user requests a media withdrawal;

providing instructions via the main display instructing the user to enter the code displayed on the second display on the keypad; and only after the user enters the code displayed on the second display on the keypad, causing a requested amount of media to be dispensed via the media dispenser slot and causing the door or flap portion of the shutter mechanism to move to the open position.

2. The terminal of claim 1, wherein the door or flap of the shutter mechanism is formed from a transparent material.

3. The terminal of claim 2, wherein the transparent material comprises a chemically strengthened glass.

4. The terminal of claim 1, wherein the door or flap of the shutter mechanism includes a window that is formed from a transparent material.

5. The terminal of claim 4, wherein the transparent material comprises a chemically strengthened glass.

6. The terminal of claim 1, wherein the terminal is an automated teller machine.

7. The terminal of claim 1, wherein the media is cash.

8. A terminal, comprising:

a media dispenser slot;

a shutter mechanism having a door or flap portion that is configured to cover the media dispenser slot in a closed position and to provide access to the media dispenser slot in an open position;

a first sensor mounted adjacent to the media dispenser slot facing an inner surface of the door or flap portion of the shutter mechanism, the first sensor configured to generate a first signal representing a distance from the first sensor to the inner surface of the door or flap portion of the shutter mechanism;

a second sensor mounted adjacent to the media dispenser slot, the second sensor configured to generate a second signal indicating whether the door or flap portion of the shutter mechanism is open or closed;

a processor; and a non-transitory computer readable storage medium comprising executable instructions that cause the processor to perform operations comprising:

receive the first signal and compare the received first signal to a predetermined distance threshold to determine if an overlay device has been attached to the terminal;

receive the second signal and, based on the second signal, calculate an open time for each time the door or flap portion of the shutter mechanism moves from the closed position to the open position and then back to the closed position; and compare the calculated open time to a predetermined range of open times and, when the calculated open time exceeds the predetermined range of open times, increase the predetermined distance threshold.

9. The terminal of claim 8, wherein the first sensor is selected from the group consisting of an infrared time of flight sensor and an ultrasonic sensor.

10. The terminal of claim 8, wherein the second sensor is an optical sensor.

11. A terminal, comprising:

a main display;

a keypad;

a media dispenser slot;

a shutter mechanism having a door or flap portion that is configured to cover the media dispenser slot in a closed position and to provide access to the media dispenser slot in an open position, the door or flap portion having at least a part thereof that is transparent;

a touch sensor mounted on an outer surface of the door or flap portion of the shutter mechanism and the media dispenser slot, the touch sensor configured to generate a signal when touched by a user;

a second display mounted between the door or flap portion of the shutter mechanism and the media dispenser slot, wherein the second display is viewable through the transparent part of the door or flap portion of the shutter mechanism;

a first sensor mounted adjacent to the media dispenser slot facing an inner surface of the door or flap portion of the shutter mechanism, the first sensor configured to generate a first signal representing a distance from the first sensor to the inner surface of the door or flap portion of the shutter mechanism;

a second sensor mounted adjacent to the media dispenser slot, the second sensor configured to generate a second signal indicating whether the door or flap portion of the shutter mechanism is open or closed;

a processor; and a non-transitory computer readable storage medium comprising executable instructions that cause the processor to perform operations comprising:

receive the first signal and compare the received first signal to a predetermined distance threshold to determine if an overlay device has been attached to the terminal;

receive the second signal and, based on the second signal, calculate an open time for each time the door or flap portion of the shutter mechanism moves from the closed position to the open position and then back to the closed position;

compare the calculated open time to a predetermined range of open times and, when the calculated open time exceeds the predetermined range of open times, increase the predetermined distance threshold;

cause a code to be displayed on the second display when the user requests a media withdrawal;

provide instructions via the main display instructing the user to enter the code displayed on the second display on the keypad and to touch the touch sensor; and only after the user enters the code displayed on the second display on the keypad and touches the touch sensor, causing a requested amount of media to be dispensed via the media dispenser slot and causing the door or flap portion of the shutter mechanism to move to the open position.

12. The terminal of claim 11, wherein the door or flap of the shutter mechanism is formed from a transparent material or includes a window that is formed from a transparent material.

13. The terminal of claim 12, wherein the transparent material comprises a chemically strengthened glass.

14. The terminal of claim 11, wherein the touch sensor is selected from the group consisting of a capacitive sensor, a resistive touch sensor, a piezoelectric sensor, an optical touch sensor, an inductive touch sensor, a force-sensitive resistor, a hall effect sensor, a touch-activated membrane switch, a surface acoustic wave (saw) sensor, or a triboelectric sensor.

15. The terminal of claim 11, wherein the terminal is an automated teller machine.

16. The terminal of claim 11, wherein the media is cash.

* * * * *